United States Patent [19]
Matsuda

[11] Patent Number: 5,406,400
[45] Date of Patent: Apr. 11, 1995

[54] TEMPERATURE COMPENSATION FOR PHOTOCONDUCTIVE TYPE LIQUID CRYSTAL LIGHT VALVE HAVING LIGHT SHIELDING LAYER

[75] Inventor: Norio Matsuda, Tsurugashima, Japan

[73] Assignee: Pioneer Electronic Corporation, Tokyo, Japan

[21] Appl. No.: 63,092

[22] Filed: May 18, 1993

[30] Foreign Application Priority Data

May 22, 1992 [JP] Japan .................. 4-130958

[51] Int. Cl.⁶ ............... G02F 1/133; G09F 9/32
[52] U.S. Cl. ........................ 359/86; 359/72; 359/87
[58] Field of Search .............. 359/72, 86, 87, 85, 359/67; 345/101

[56] References Cited

U.S. PATENT DOCUMENTS

| | | | |
|---|---|---|---|
| 4,045,791 | 8/1977 | Fukai et al. ........................ | 345/101 |
| 4,425,027 | 1/1984 | Portmann ........................... | 359/86 |
| 4,460,247 | 7/1984 | Hilsum et al. ...................... | 359/86 |
| 4,919,520 | 4/1990 | Okada et al. ....................... | 359/86 |
| 5,157,525 | 10/1992 | Eaton et al. ...................... | 359/86 |
| 5,253,074 | 10/1993 | Wortel et al. ..................... | 359/86 |

FOREIGN PATENT DOCUMENTS

| | | | |
|---|---|---|---|
| 404055814 | 2/1992 | Japan ........................ | 359/86 |
| 404104223 | 4/1992 | Japan ........................ | 359/86 |

*Primary Examiner*—William L. Sikes
*Assistant Examiner*—Tai V. Duong
*Attorney, Agent, or Firm*—Cushman, Darby & Cushman

[57] ABSTRACT

A photoconductive type liquid crystal valve maintains good gradation contrast characteristics in a projection image irrespective of if and when a possible temperature change occurs. The photoconductive type liquid crystal light valve comprises a laminated body including a liquid crystal layer 15, a photoconductive layer 15, and a light shielding layer 17, and a pair of driving electrodes which sandwich the laminated body and form an image forming area. A pair of temperature detecting electrodes are provided at positions out of the image forming area to sandwich at least the light shielding layer and detect a change in impedance of the light shielding layer, thereby detecting a temperature change of the light valve. By changing the level of a driving voltage signal which is supplied to the driving electrode on the basis of the detected temperature change, the gradation characteristics and contrast can be held constant from the time point of the initial setting of the black level even when the temperature fluctuates.

12 Claims, 16 Drawing Sheets

TEMPERATURE COMPENSATION FOR PHOTOCONDUCTIVE TYPE LIQUID CRYSTAL LIGHT VALVE HAVING LIGHT SHIELDING LAYER

BACKGROUND OF THE INVENTION

1. Field of the Invention

The present invention relates to a photoconductive liquid crystal light valve for use in a projection type liquid crystal display apparatus.

2. Background of the Invention

FIG. 1 shows an example of a projection type liquid crystal display apparatus which is constructed by using such a photoconductive type liquid crystal light valve.

In FIG. 1, an output driving voltage signal of a driving voltage source 101 is supplied between one and the other electrodes, which will be explained hereinafter, of a photoconductive type liquid crystal light valve 1. As means for writing images to the light valve 1, for example, an optical fiber tube is used. The optical fiber tube is constructed by a CRT (Cathode Ray Tube) 3 to which a video signal $V_V$ is supplied through a video amplifier 2 and optical fibers 4 which are coupled to the CRT and lead an image formed on the CRT 3 to the liquid crystal light valve 1. An output image of the CRT 3 is written to a photoconductive film of the light valve 1. The video amplifier 2 changes the level of the output video signal in accordance with a control signal $V_C$, thereby enabling the output image of the CRT 3, namely, the writing light level to the light valve 1 is varied.

A reading light emitted from a light source 5 is reflected by a mirror 6 and passes through a condenser lens 7 and enters a polarization beam splitter 8. The P polarization component in the incident light directly passes through the polarization beam splitter 8, while the progressing direction of the S polarization component is bent at a right angle, then the S polarized light enters the light valve 1.

Now, assuming that the image is drawn in the liquid crystal layer of the light valve 1 the, P polarized component is locally included in the refection light reflected by the light valve 1 in accordance with the light and shade of the image in the liquid crystal layer. Only the P polarized component in the reflected light directly passes through the polarization beam splitter 8 and passes through a projecting lens 9, so that the image corresponding to the P polarized component is projected onto a screen 10.

FIG. 2 shows a construction of the photoconductive type liquid crystal light valve 1 which is used in such a projection type liquid crystal display apparatus.

In FIG. 2, a spacer 12 is arranged around a liquid crystal layer 11. Orientation films 13 and 14 are formed on both sides of the liquid crystal layer 11. The liquid crystal layer 11 and a photoconductive layer 15 form a laminate body so as to sandwiching a dielectric mirror 16 as a light reflecting film and a light shielding film 17 made of, for example, CdTe. The light reflecting film 16 is used to reflect the projection light which enters from the reading side. The light shielding film 17 is used to absorb the light leaked from the light reflecting film 16 and to shut out the light to the photoconductive film 15, Transparent conductive films 18 and 19 as one and another driving electrodes which sandwich such a laminate body are arranged on the outside of the liquid crystal layer 11 and photoconductive film 15. All of the above components are sealed by glass substrates 20 and 21.

In the photoconductive type liquid crystal light valve 1 having such a construction, when an image is drawn on the photoconductive film 15 by the writing light entering from the right side (writing side) in the diagram, an internal resistance of the photoconductive film 15 locally changes in accordance with the dark/light state of the image. Therefore, a driving voltage due to a driving voltage signal $V_{LCLV}$ which is supplied across the transparent electrodes 18 and 19 is applied to the liquid crystal layer 11 adjacent to the positions corresponding to those resistance changed portions in accordance with the light and shade of the image and is spatially modulated.

A voltage value of the driving voltage signal $V_{LCLV}$ is generally set in the following manner.

FIG. 3 shows characteristics of an output projection light level I to a voltage $V_{LC}$ [Volts] which is applied to the liquid crystal layer 11 in the case where the predetermined reading light enters the light valve 1. As will be obviously understood from the characteristics graph, when the voltage applied to the liquid crystal layer 11 is gradually increased from O V, an output projection light starts to occur at a certain voltage value. After that, the output projection light I exhibits characteristics which draw a curve $i_0$ such that the output projection light level I passes through what is called a black level of a standard video signal and reaches a white level thereof. An applied voltage $V_{black}$ of the liquid crystal layer 11 corresponding to the black level in this instance indicates a threshold voltage $V_{th}$. The voltage value of the output driving voltage signal $V_{LCLV}$ of the driving voltage source 101 is set so as to satisfy the threshold voltage $V_{th}$. The threshold voltage $V_{th}$ is, therefore, determined by an impedance ratio of the layers between the electrodes of the light valve 1 and the voltage value of the driving voltage signal $V_{LCLV}$.

Referring again to FIG. 1, however, the apparatuses excluding the screen 10, and the circuits and parts are enclosed in a casing 30 of the system. In such a casing, a temperature of locations near the light valve 1 changes due to heat sources such as lamp 5 for projecting the light, circuit board on which the video amplifier 2 and the like are installed, and the like. In accordance with such a temperature change, the voltage which is applied to the liquid crystal layer 11 is also deviated from the threshold voltage $V_{th}$ to be applied to the liquid crystal layer 11. The black level of the output projection light is deviated from the black level at the time of the setting of the driving voltage signal $V_{LCLV}$, thereby causing deteriorations of gradation characteristics and contrast of the projection image.

OBJECTS AND SUMMARY OF THE INVENTION

The present invention has been made in consideration of the above problems, and it is an object of the invention to provide a photoconductive type liquid crystal light valve which can maintain good gradation characteristics and contrast of a projection image and also to provide a display apparatus of such a light valve even when a temperature around the light valve changes.

According to the present invention, there is provided a photoconductive type liquid crystal light valve comprising: a laminate body including a liquid crystal layer, a photoconductive layer, and a light shielding layer; and a pair of driving electrodes which sandwich the laminated body and form an image forming region, wherein the light valve has a pair of temperature change detecting electrodes which are arranged out of the image forming region and sandwich at least the light shielding layer.

According to the invention, there also is provided a display apparatus of such a photoconductive type liquid crystal light valve, in which at least one of photoconductive type liquid crystal light valve elements is built in a casing and each of such a photoconductive type liquid crystal light valve elements comprises a laminated body including a liquid crystal layer, a photoconductive layer, and a light shielding layer and a pair of driving electrodes which sandwich the laminate layer and form an image forming region, wherein another photoconductive type light valve element for temperature change detection having the same structure as that of the above photoconductive type light valve element is built in the casing.

In the photoconductive type liquid crystal light valve according to the invention, a voltage signal can be supplied to the light shielding layer which is formed at a position out of the image forming region.

In the display apparatus of the photoconductive type liquid crystal light valve according to the present invention, it is possible to detect a change in impedance between a pair of electrodes of another photoconductive type liquid crystal light valve for detection of a temperature change which is arranged in the casing and is different from the photoconductive type liquid crystal light valve to form an image.

DETAILED DESCRIPTION OF THE EMBODIMENTS

An embodiment of the present invention will be described in detail hereinbelow with reference to the drawings.

Figure 2:
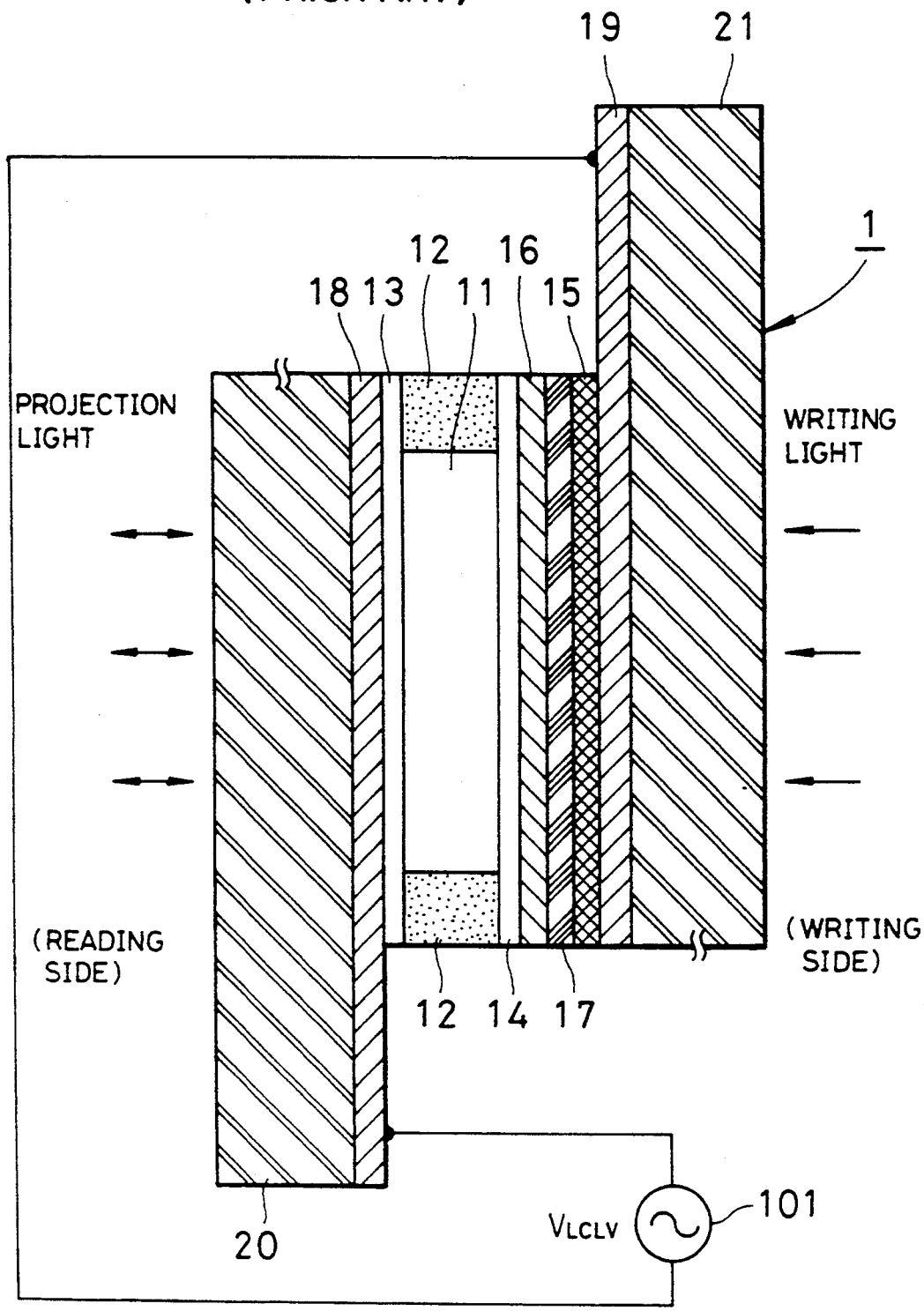
FIG. 2 is a diagram showing a construction of a conventional photoconductive type liquid crystal light valve.
Figure 4:
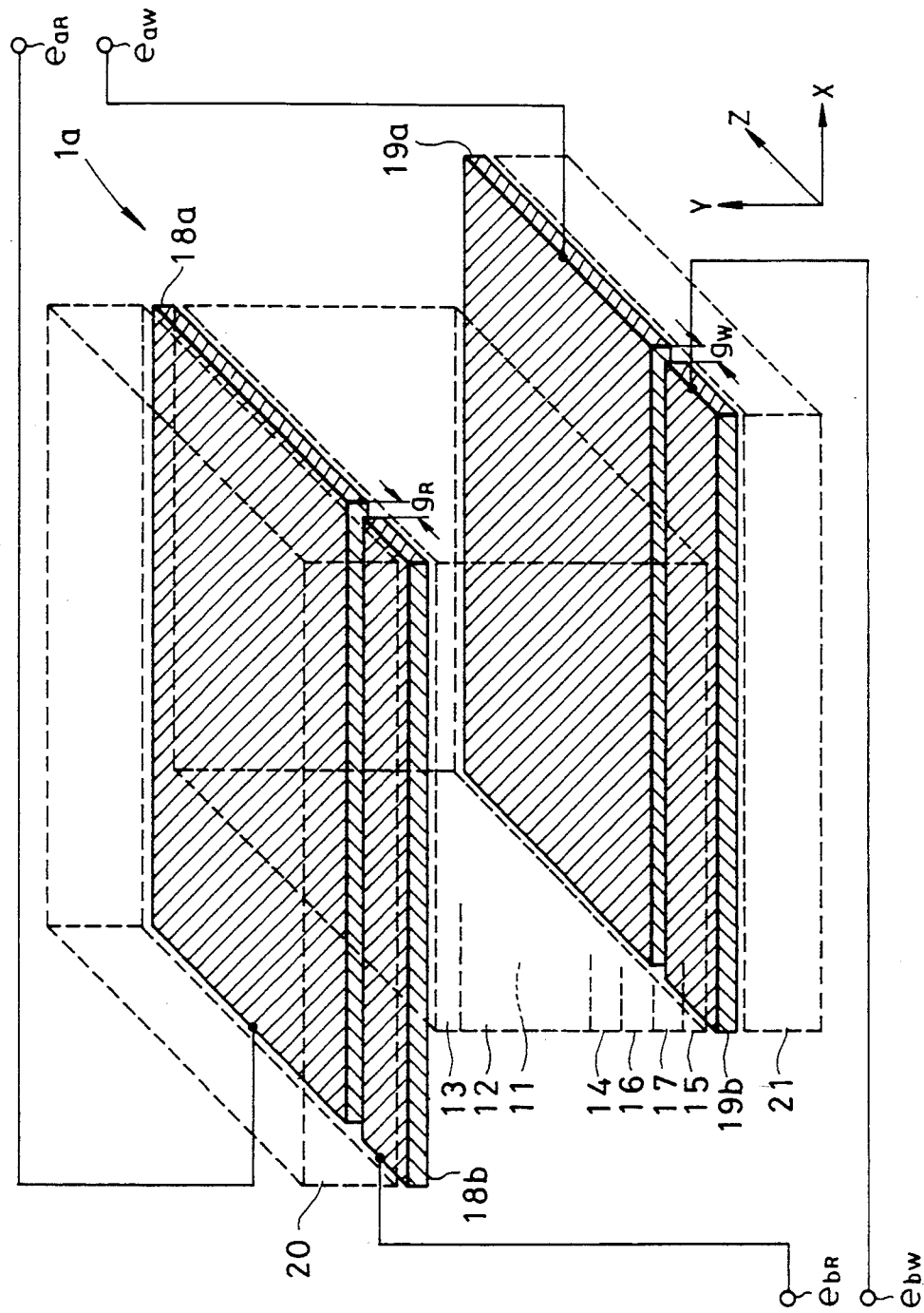
FIG. 4 is a diagram showing a structure of a photoconductive type liquid crystal light valve according to an embodiment of the present invention.

FIG. 4 is a diagram showing a structure of a photoconductive type liquid crystal light valve according to an embodiment of the invention. In FIG. 4, the same component elements as those shown in FIG. 2 are designated by the same reference numerals. In FIG. 4, in order to further clarify the characteristic portion of the light valve, only the electrode layer portions of the light valve are drawn by solid lines and the other layers are shown by broken lines and their detailed descriptions are omitted here.

As shown in FIG. 4, each electrode layer of a light valve $1a$ in the embodiment is divided into inherent electrode portions $18a$ and $19a$ to form an image and electrode portions $18b$ and $19b$ to detect a temperature change as characteristic parts of the invention. There is an electrically isolating gap $g_W$ between the electrode $18a$ to form an image and the electrode $18b$ to detect a temperature change in the electrode layer on the reading side. There is an electrically isolating gap $g_R$ between the electrode $19a$ to form an image and the electrode $19b$ to detect a temperature change in the electrode layer on the writing side. The electrode $19a$ on the writing side is routed to a terminal $e_{aW}$. The electrode $18a$ on the reading side is routed to a terminal $e_{aR}$. The electrode $19b$ on the writing side is routed to a terminal $e_{bW}$. The electrode $18b$ on the reading side is routed to a terminal $e_{bR}$.

Figure 1:
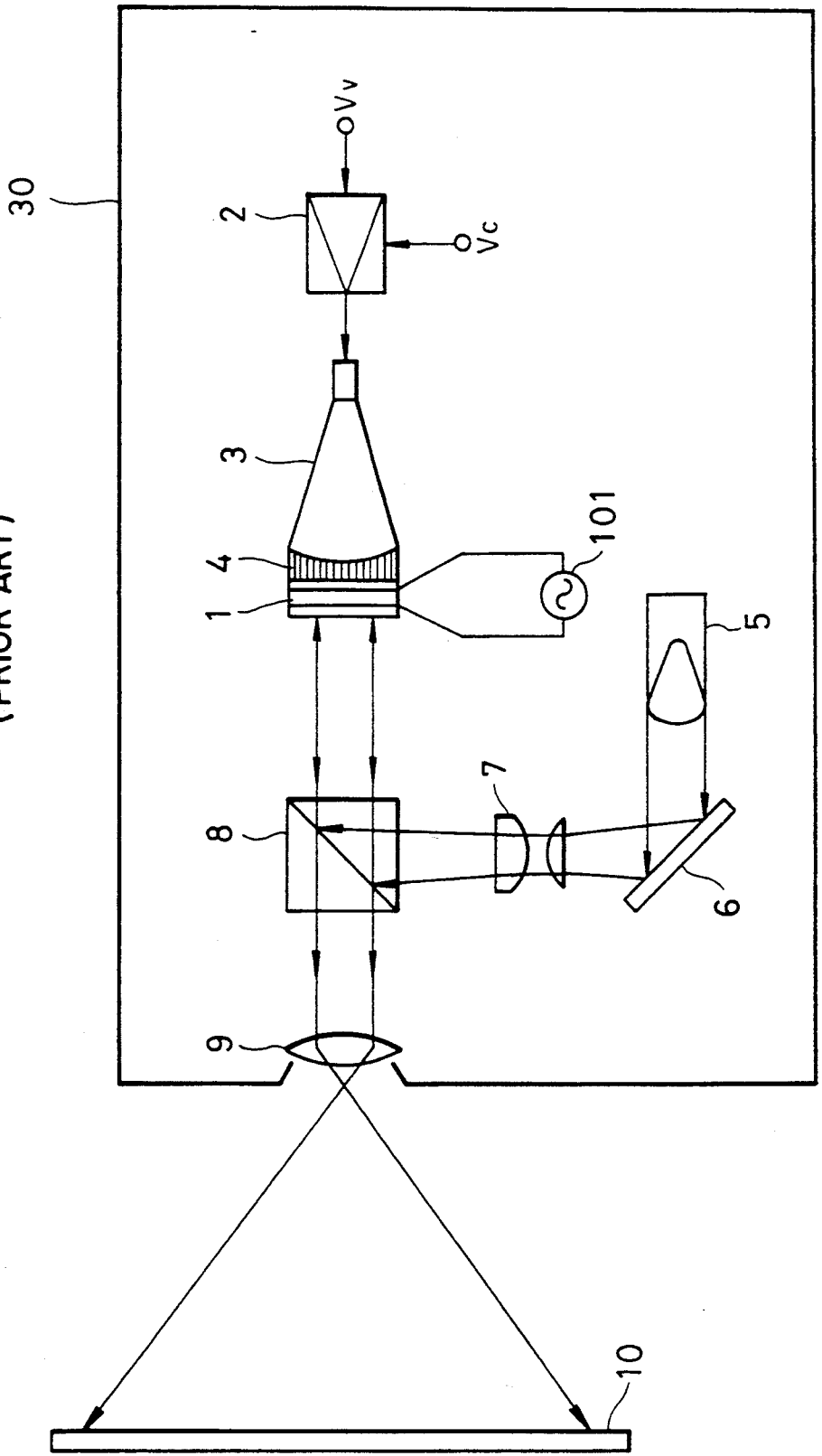
FIG. 1 is a diagram showing a construction of a conventional projection type liquid crystal display apparatus.
Figure 5:
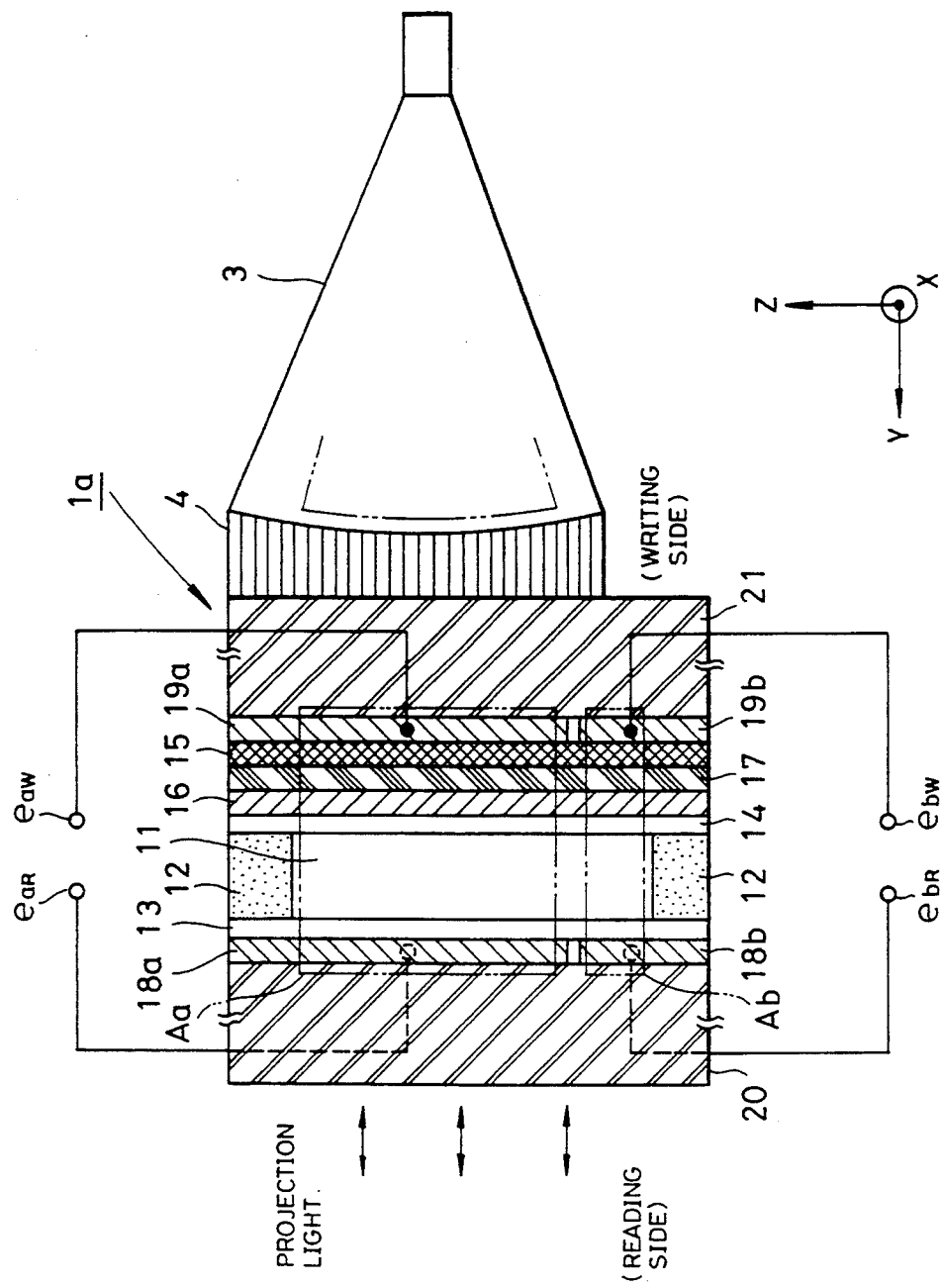
FIG. 5 is a diagram with a part cut away showing a construction in which a CRT is coupled to the photoconductive type liquid crystal light valve of FIG. 4.
Figure 6:
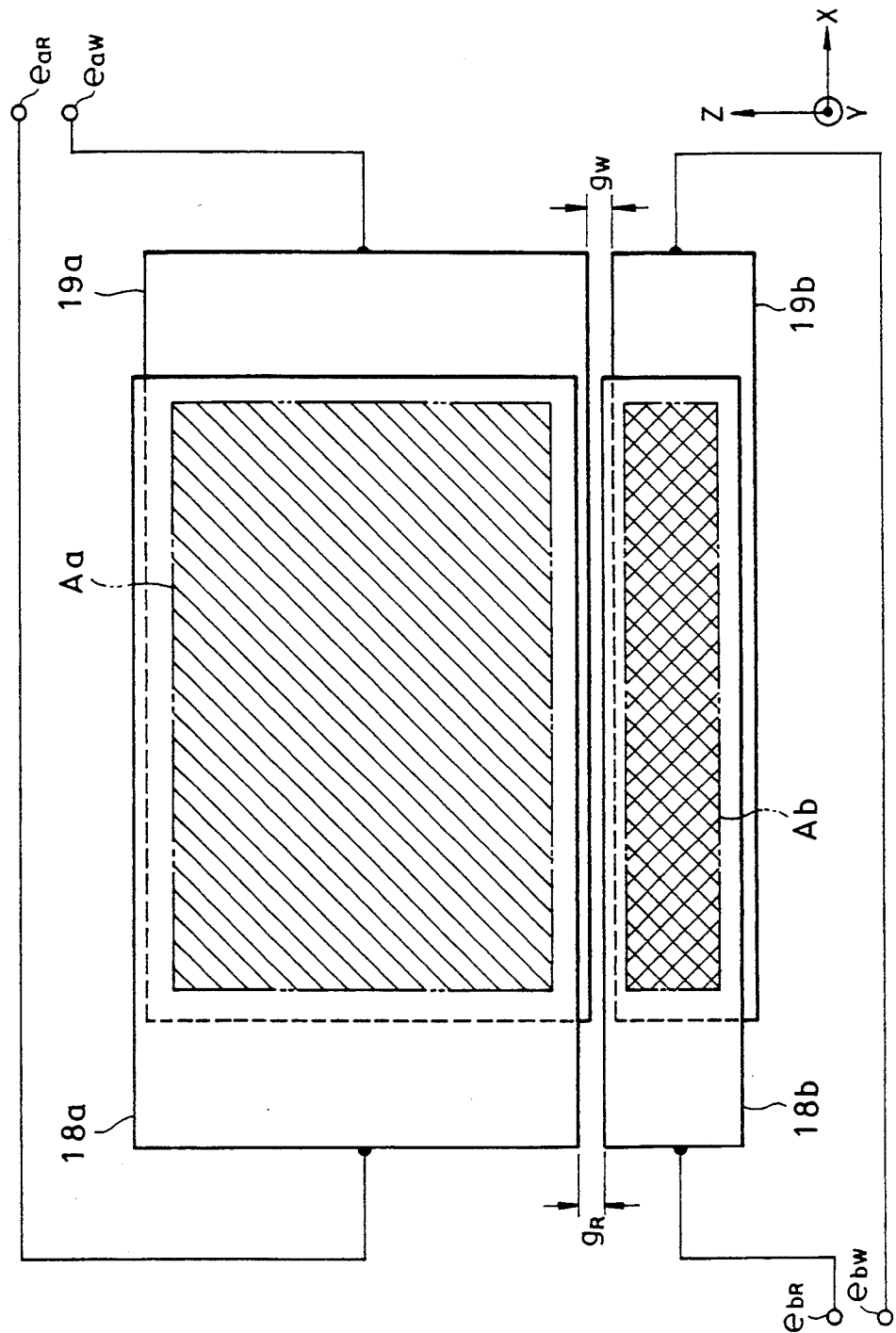
FIG. 6 is a perspective view of an embodiment of the present invention seen through from the reading side while leaving only electrode layers of the photoconductive type liquid crystal light valve of FIG. 4.

FIG. 5 is a partially cross-sectional view showing a construction in which the CRT 3 is connected to the light valve $1a$ in FIG. 4. In FIG. 5, the portions similar to those shown in FIGS. 1 and 2 are designated by the same reference numerals. FIG. 6 is a perspective view when the light valve $1a$ is seen through from the upper portion of FIG. 4 while leaving only the electrode layer. The electrode portions in FIG. 6 are illustrated so as to be slightly deviated in the vertical direction in order to further clarify degrees of overlapping states of those electrode portions.

In the diagrams, an output image from the CRT 3 enters the light valve $1a$ through the optical fibers 4. In the light valve $1a$, the incident image is led into a standard write effective area $A_a$ as an image forming area. The write effective area $A_a$ is sandwiched by the image forming electrodes $18a$ and $19a$ on the reading and writing sides and lies within the electrode surfaces. On the other hand, a temperature change detecting area Ab is sandwiched by the temperature change detecting electrodes 18b and 19b on the reading and writing sides and lies within the electrode surfaces. The area $A_b$ is located below the write effective area $A_a$.

Figure 7:
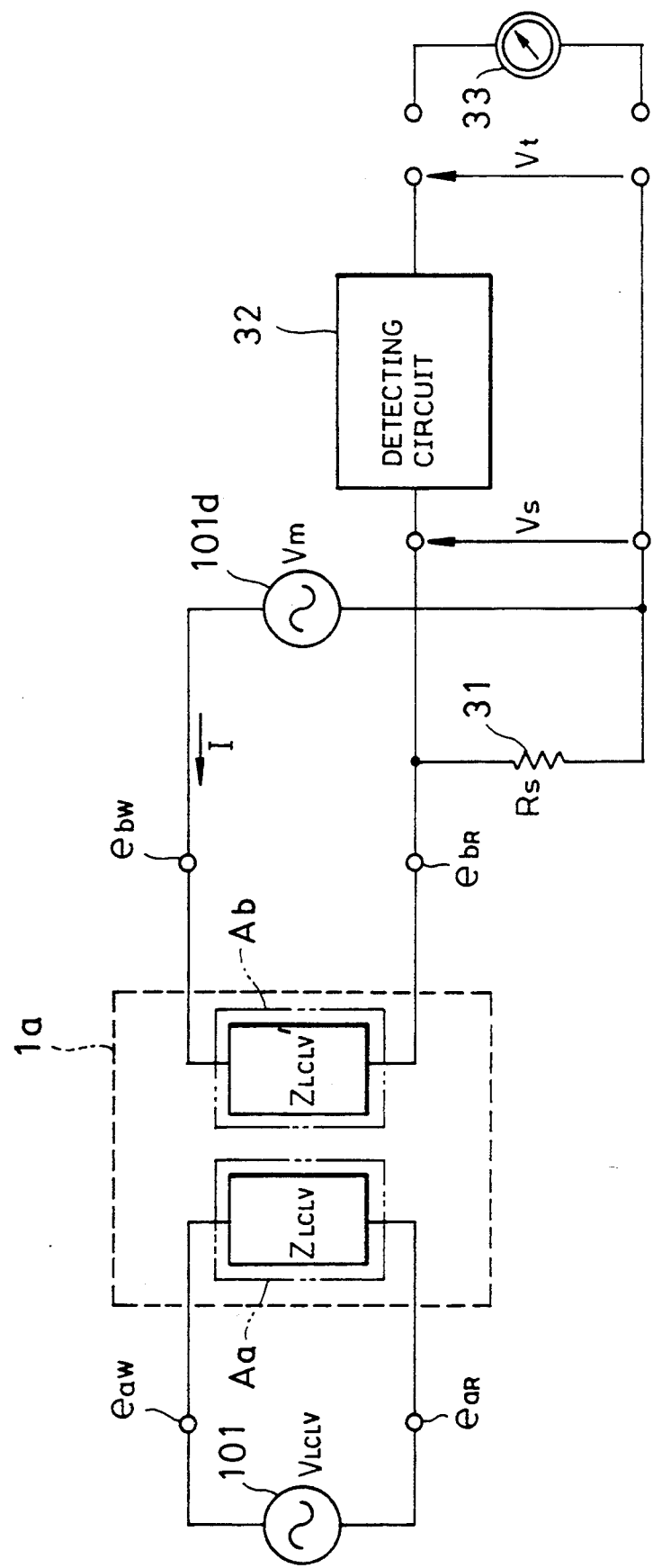
FIG. 7 is a diagram showing a construction in which temperature detecting means is added to the photoconductive type liquid crystal light valve of FIG. 4.

FIG. 7 shows an equivalent circuit of the light valve 1a.

Specifically, the write effective area $A_a$ of the light valve 1a is expressed by an impedance $Z_{LCLV}$ between the image forming electrodes 18a and 19a. The temperature change area $A_b$ is expressed by an impedance $Z_{LCLV}$ between the temperature change detecting electrodes 18b and 19b.

The voltage source 101 to supply an AC voltage signal $V_{LCLV}$ to drive the light valve is connected to the terminals $e_{aW}$ and $e_{aR}$. A serial circuit of a voltage source 101d to supply an AC voltage signal $V_m$ to detect a temperature change and a temperature change detecting resistor 31 having a resistance value $R_s$ is connected to the terminals $e_{bW}$ and $e_{bR}$.

Figure 8:
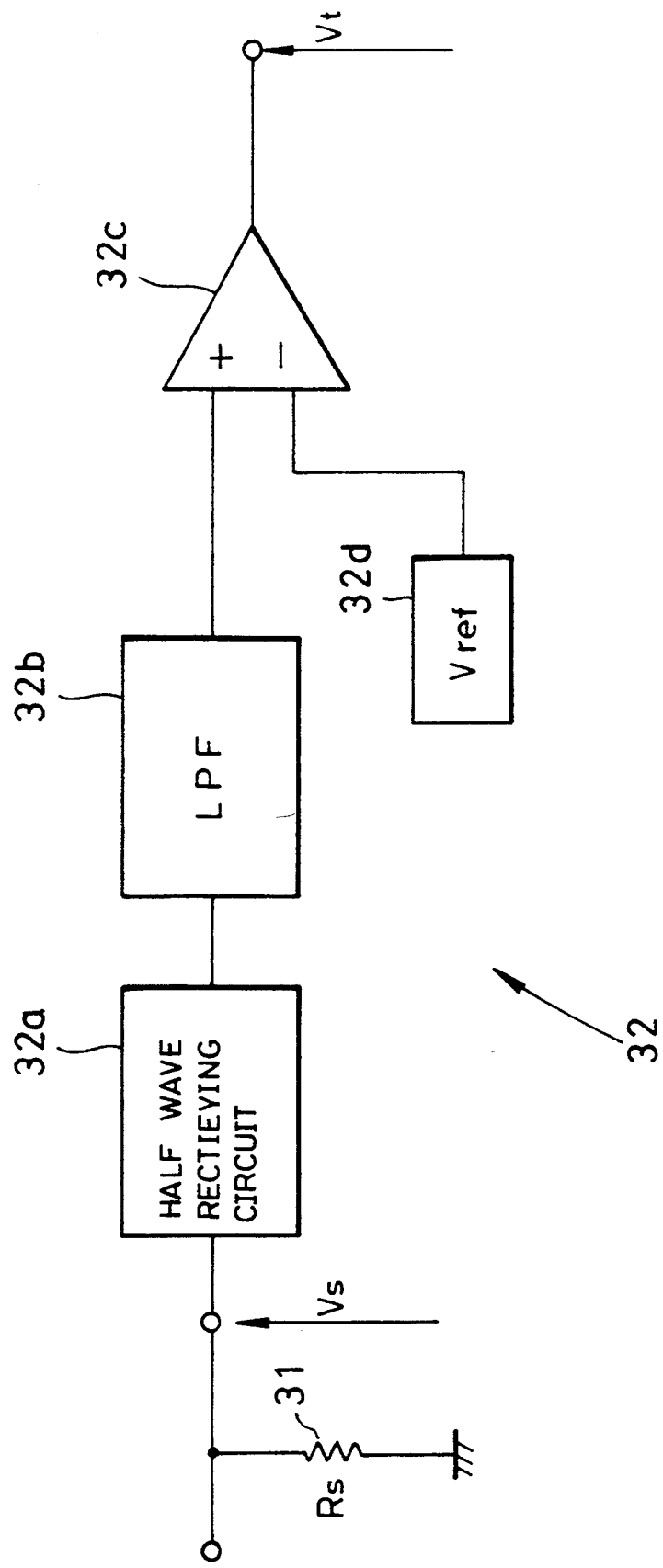
FIG. 8 is a diagram showing a practical circuit example of a detecting circuit in FIG. 7.

The detecting resistor 31 detects a change in impedance $Z_{LCLV}$ in the temperature change detecting area $A_b$ of the light valve 1a due to a temperature change around the light valve 1a. The temperature change can be detected by monitoring a voltage $V_s$ across the detecting resistor 31. The voltage $V_s$ across the resistor 31 is converted into a detection voltage $V_t$ of a DC level by a detecting circuit 32 which is constructed by a specific circuit example as shown in FIG. 8. The detection voltage $V_t$ can be observed by, for example, a meter 33 to monitor a temperature change.

As shown in FIG. 8, in the detecting circuit 32, the voltage $V_s$ across the resistor 31 is supplied to a differential amplifier 32c through a half-wave rectifying circuit 32a and a low pass filter 32b. A comparison output between the voltage $V_s$ and an output reference voltage $V_{ref}$ of a reference voltage source 32d is obtained as a voltage $V_t$. In addition to the above detecting meter 33, for example, by displaying the content according to the level of the voltage $V_t$ at an operating section, the temperature of the light valve can be informed to the user. Moreover, by transmitting the information data of such a voltage level to a system controller, a control process according to the temperature of the light valve can be performed.

Therefore, the user who or the system controller which knew that the temperature around the light valve 1a was deviated from a predetermined temperature corresponding to the reference voltage $V_{ref}$ can correct the voltage level of the driving voltage signal $V_{LCLV}$ of the light valve 1a by using the control signal $V_c$ by only an amount corresponding to the deviation from the predetermined temperature. By such a correction, the light valve 1a can maintain the gradation characteristics and contrast in the projection image constant. Since the temperature change of the light valve 1a is detected by using a temperature sensitive performance of the impedance in each layer of the light valve 1a itself, so that the temperature can be simply and accurately detected.

The principle of the detection of the temperature change of the light valve 1a which is executed by the detecting resistor 31 will now be described in detail.

It is now assumed that impedances of the liquid crystal layer 11, dielectric mirror 16, and light shielding film 17 between the temperature change detecting electrodes of the light valve 1a as shown in FIGS. 4 and 5 are respectively set to $Z_{LC}$, $Z_{DM}$, and $Z_{PMO}$ and that an impedance of the photoconductive film 15 in a dark state is set to $Z_{a(dark)}'$. The impedance $Z_{LCLV}$ between the temperature change detecting electrodes is obtained by the following equation.

$$Z_{LCLV} = Z_{LC} + Z_{DM} + Z_{PMO} + Z_{a(dark)}' \quad (1)$$

Now, assuming that a current flowing in the impedance $Z_{LCLV}$ is I, $$V_m = I(R_s + Z_{LCLV}) \quad (2)$$

Therefore, $$I = V_m/(R_s + Z_{LCLV}) \quad (3)$$

Thus, the voltage V which is developed across the detecting resistor 31 is $$V_s = I \cdot R_s = V_m \cdot R_s/(R_s + Z_{LCLV}) \quad (4)$$

A change in impedance $A_{PMO}$, namely, a temperature dependency of the light shielding film 17 exerts a large influence on a fluctuation of the applied voltage of the liquid crystal layer 11 due to the temperature change at the impedance $Z_{LCLV}$ as shown in the equation (1). Since the changes of the other impedances are small enough that they can be ignored. The voltage $V_s$, thus, largely depends on a change in impedance $Z_{PMO}$ of the light shielding film 17. Therefore, by monitoring the voltage $V_s$, the temperature change of the light valve 1a can be detected.

Figure 9:
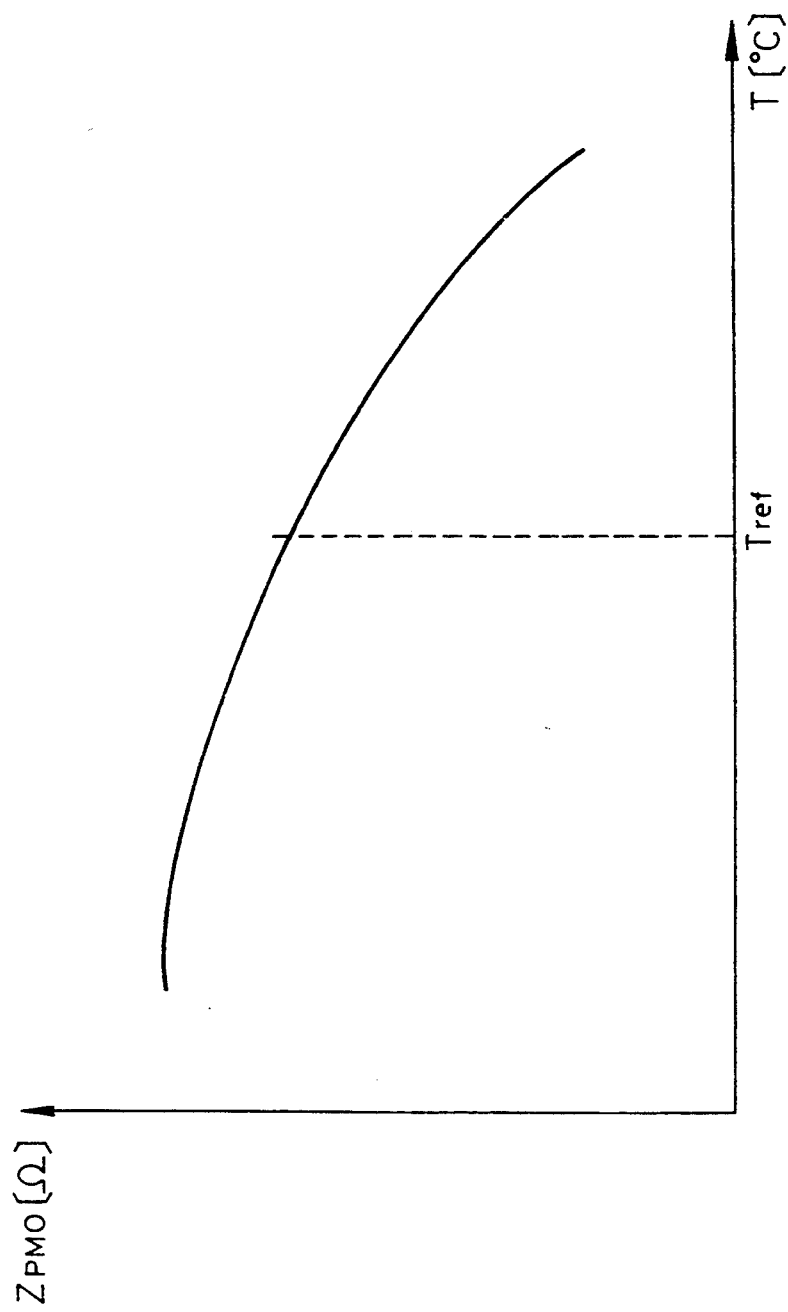
FIG. 9 is a diagram showing characteristics of an impedance of a light shielding film to a temperature.
Figure 10:
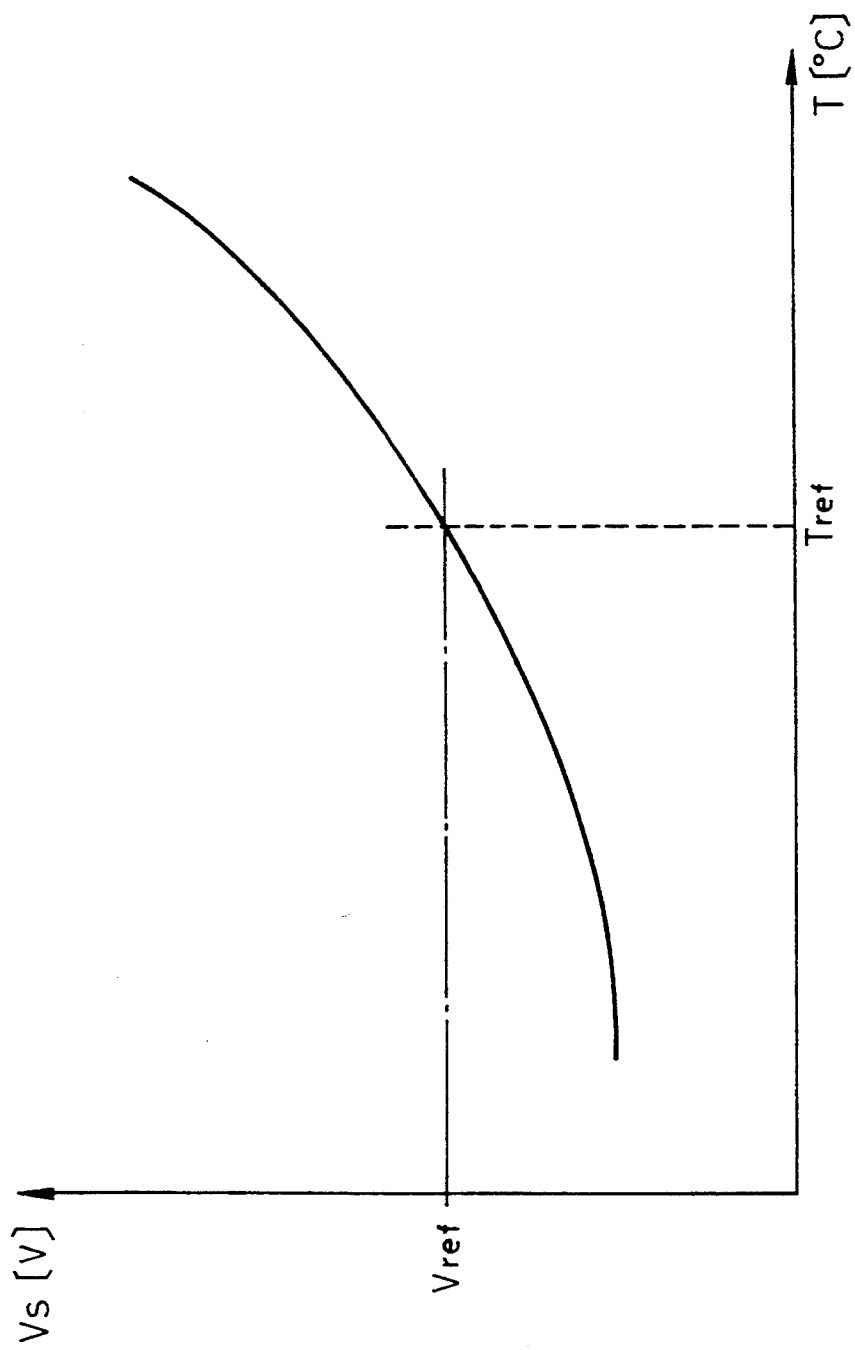
FIG. 10 is a diagram showing characteristics of a voltage across a detection resistor to a temperature.

FIG. 9 shows characteristics of an impedance $Z_{PMO}[\Omega]$ of the light shielding film 17 to a temperature $T[°C.]$ between the temperature change detecting electrodes at a predetermined operating frequency. FIG. 10 shows characteristics of the voltage $V_s[V]$ across the detecting resistor 31 at the temperature $T[°C.]$.

In both of the graphs, $T_{ref}$ denotes a reference temperature when the voltage value of the driving voltage signal $V_{LCLV}$ corresponding to the standard black level in the output projection light of the light valve 1a as mentioned above. $V_{ref}$ denotes the input reference voltage of the differential amplifier 32c in the detecting circuit 32 corresponding to the reference temperature. The differential amplifier 32c, therefore, generates what is called a temperature change signal as a voltage $V_t$ indicative of a deviation amount from the reference temperature $T_{ref}$.

The correction of the driving voltage signal level of the light valve 1a based on the temperature change detected as mentioned above will now be described.

Figure 11:
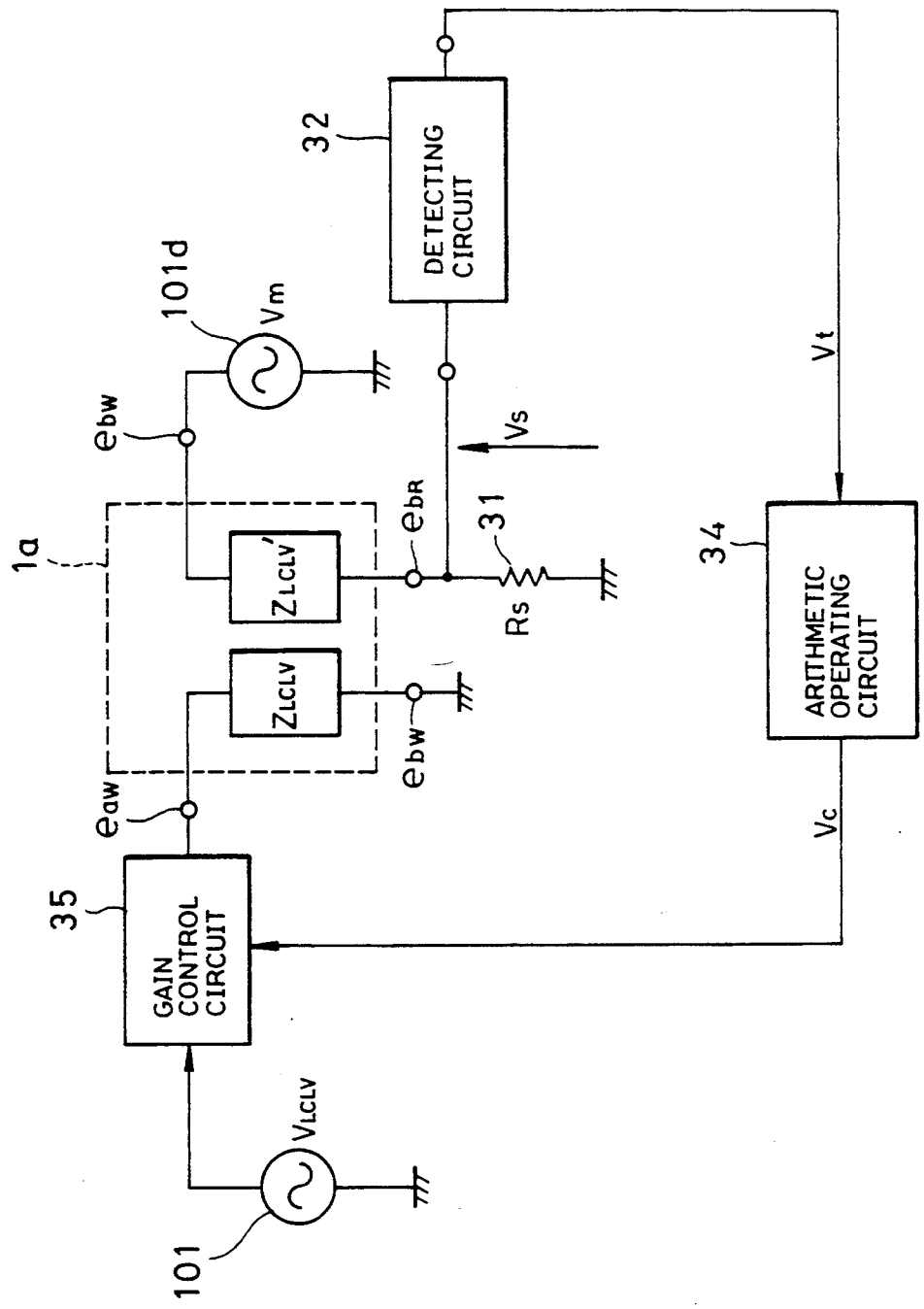
FIG. 11 is a diagram showing a construction in which control means for correcting a driving voltage is further added to the construction of FIG. 7.

FIG. 11 is a block diagram showing an example of such a correcting circuit and the portion similar to those shown in FIG. 7 are designated by the same reference numerals.

In FIG. 11, the output detection voltage Vt of the detecting circuit 32 is supplied to an arithmetic operating circuit 34 including, for example, a CPU or the like. On the basis of the detection voltage $V_t$, the operating circuit 34 calculates the control signal $V_c$ to change a gain of a gain control circuit 35, which is arranged between the driving voltage source 101 and the terminal $e_{aW}$. The gain control circuit 35 changes its gain in accordance with the control signal V , thereby changing the level of the driving voltage signal that is supplied to the light valve 1a.

In the above construction, a voltage $V_{LC(dark)}$ which is applied to the liquid crystal layer 11 in a dark state is obtained by $$V_{LC(dark)} = K \cdot V_{LCLV} Z_{LC}/(Z_{LC} + Z_{DM} + Z_{PMO} + Z_{a(dark)})$$

where $Z_{LC}$, $Z_{DM}$, $Z_{PMO}$, and $Z_{a(dark)}$ denote impedances of the liquid crystal layer 11, dielectric mirror 16, light shielding film 17, and photoconductive film 15 between the image forming electrodes, respectively. K denotes a coefficient which changes in accordance with the gain of the gain control circuit 35. Since the impedance $Z_{PMO}$ of the light shielding film 17 decreases as shown in FIG. 9 in association with an increase in temperature, the voltage $V_{LC(dark)}$ applied to the liquid crystal as mentioned above changes as shown in FIG. 12 so long as K is constant. That is, in FIG. 12 such a voltage $V_{LC(dark)}$ when the voltage value of the driving voltage signal $V_{LCLV}$ corresponding to the black level at the reference temperature $T_{ref}$ is shown as a reference value $V_{LC(dark),ref}$ and it will be understood that the voltage applied to the liquid crystal is deviated from the reference value together with a temperature change from the reference temperature $T_{ref}$. By changing the coefficient K by the gain control circuit 35 accordingly, to correct such a deviation amount in accordance with the temperature change, the liquid crystal applied voltage can be held constant by the reference value $V_{LC(dark),ref}$.

Figure 12:
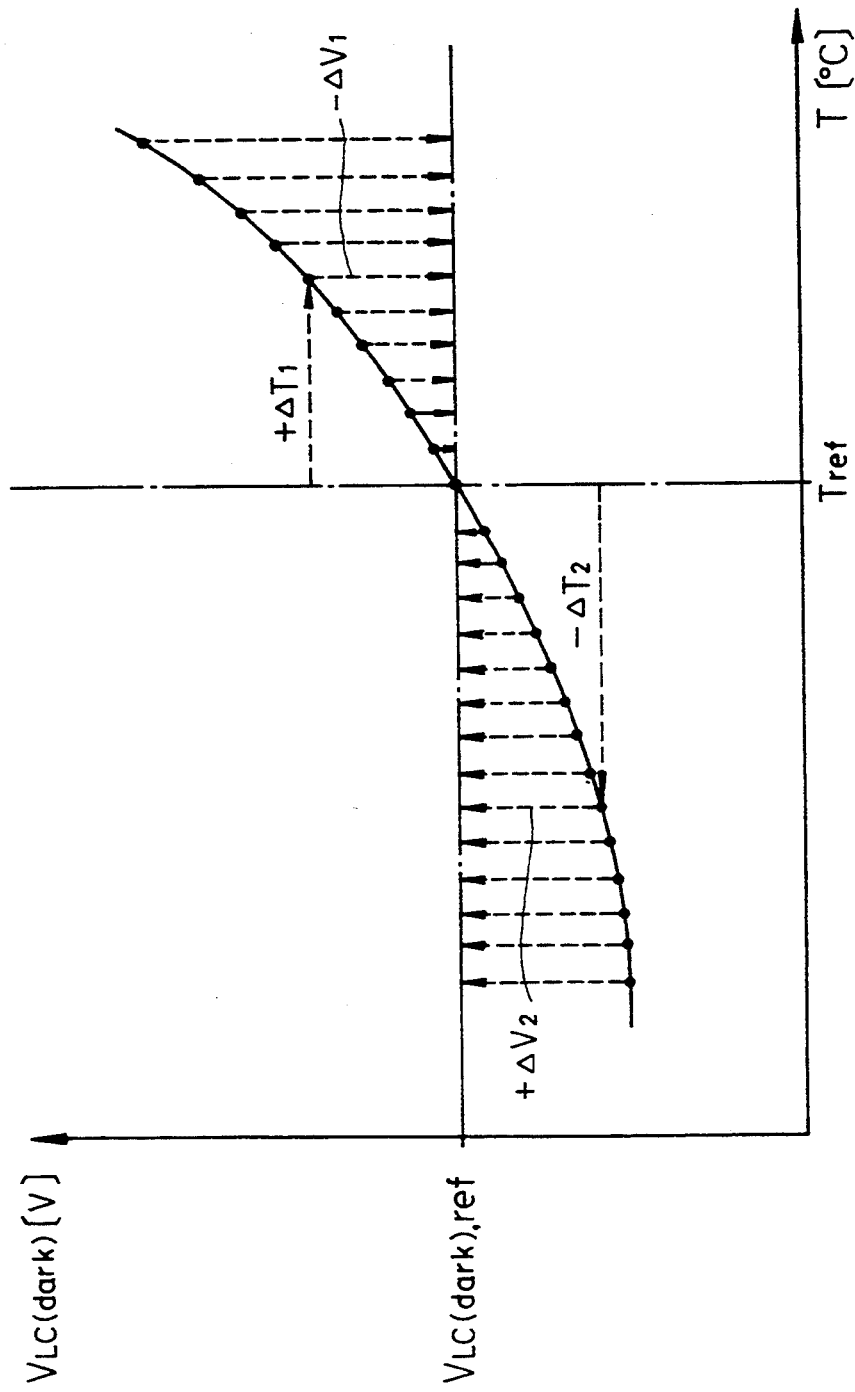
FIG. 12 is a diagram showing characteristics of a liquid crystal applied voltage to a temperature.

To realize the above processes, when the operating circuit 34 knows a temperature change amount from the reference temperature by the output detection signal $V_t$ of the detecting circuit 32, the operating circuit 34 calculates the correction amount of the liquid crystal applied voltage corresponding to the temperature change amount on the basis of the characteristics of FIG. 12 and, further, calculates the control signal $V_c$ to be supplied to the gain control circuit 35 according to the correction amount obtained. In FIG. 12, for example, when a temperature fluctuation amount $+\Delta T_1$ in such a direction as to be larger than the reference temperature $T_{ref}$ is obtained from the detection signal $V_t$, the operating circuit 34 calculates a correction voltage value $\Delta V_1$ corresponding to the temperature fluctuation amount $+\Delta T_1$. When a temperature fluctuation amount $-\Delta T_2$ in such a direction as to be smaller than the reference temperature $T_{ref}$ is obtained from the detection signal $V_t$, the operating circuit 34 calculates a correction voltage value $+\Delta V_2$ corresponding to the temperature fluctuation amount $-\Delta T_2$ and also calculates the control signal $V_c$ according to the correction voltage value. Respective values are also similarly calculated with respect to the other points. Since the gain control circuit 35, consequently, changes the driving voltage signal level which is supplied to the light valve 1a so as to set the liquid applied voltage to be constant in accordance with the control signal $V_c$ which is supplied, the light valve 1a can maintain the gradation characteristics and contrast in the projection image constant.

Figure 13:
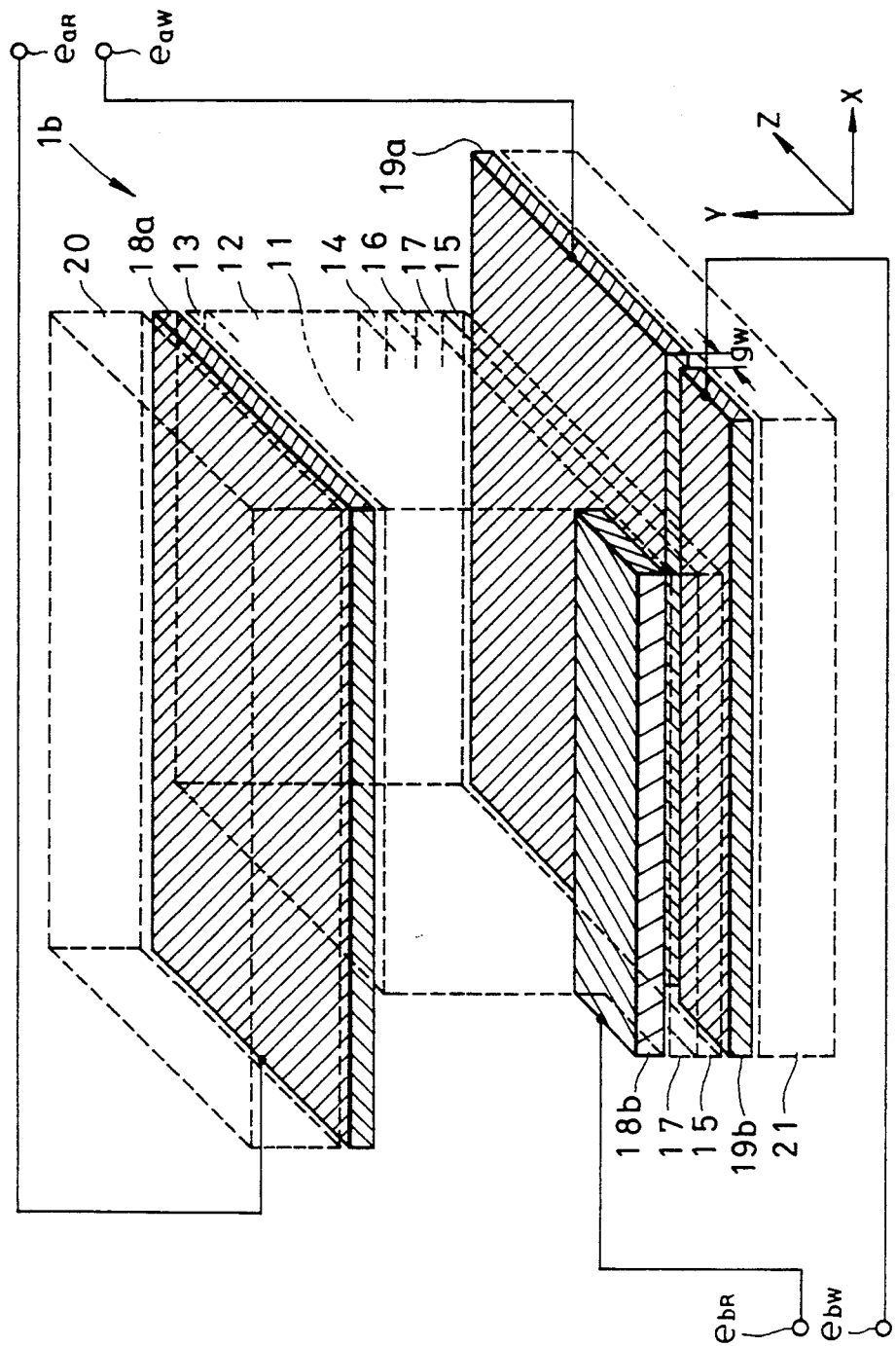
FIG. 13 is a diagram showing a structure of a photoconductive type liquid crystal light valve according to another embodiment of the invention.

FIG. 13 is a diagram showing a structure of a photoconductive type liquid crystal light valve according to another embodiment of the invention and the portions similar to those shown in FIGS. 2 and 4 are designated by the same reference numerals. In FIG. 13, only the electrode layer portions of the light valve are illustrated by solid lines in a manner similar to FIG. 4.

The embodiment is made in consideration of the fact that the temperature dependency of the light shielding film 17 exerts a large influence on the fluctuation of the liquid crystal applied voltage and an impedance change in each of the other layers is small enough such that it can be ignored. In the embodiment, only the photoconductive film 15 and light shielding film 17 are formed as layers to detect a temperature change.

Figure 3:
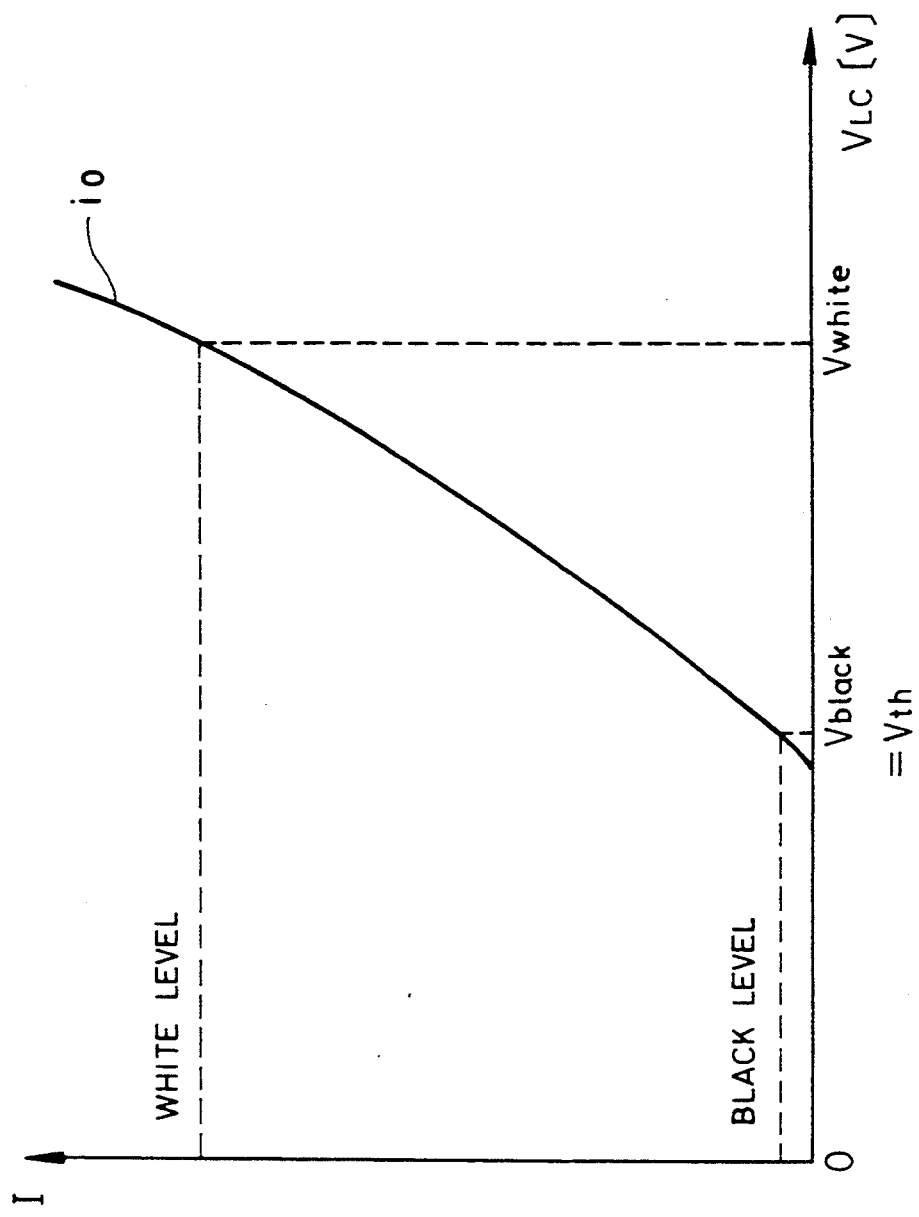
FIG. 3 is a diagram showing characteristics of the output projection light level to the voltage which is applied to a liquid crystal layer in the case where a predetermined reading light enters the light valve.

Specifically, in FIG. 13, each electrode layer of a light valve 1b has not only the inherent electrode portions 18a and 19a to form an image but also the electrode portions 18b and 19b to detect a temperature change as characteristic parts of the embodiment. The temperature change detecting electrode 19b on the writing side is formed on the glass substrate 21 in a manner similar to the light valve 1a in FIG. 3. The temperature change detecting electrode 18b on the reading side, however, is formed on and over the light shielding film 17 and photoconductive film 15 extending to the region of the temperature change detecting electrode 19b on the writing side.

There is an electrically isolating gap $g_W$ between the image forming electrode 19a on the writing side and the temperature change detecting electrode 19b. The image forming electrode 19a on the writing side is led out to the terminal $e_{aW}$. The image forming electrode 18a on the reading side is led to the terminal $e_{aR}$. The temperature change detecting electrode 19b on the writing side is routed to the terminal $e_{bW}$. The temperature change detecting electrode 18b on the reading side is routed to the terminal $e_{bR}$.

Figure 14:
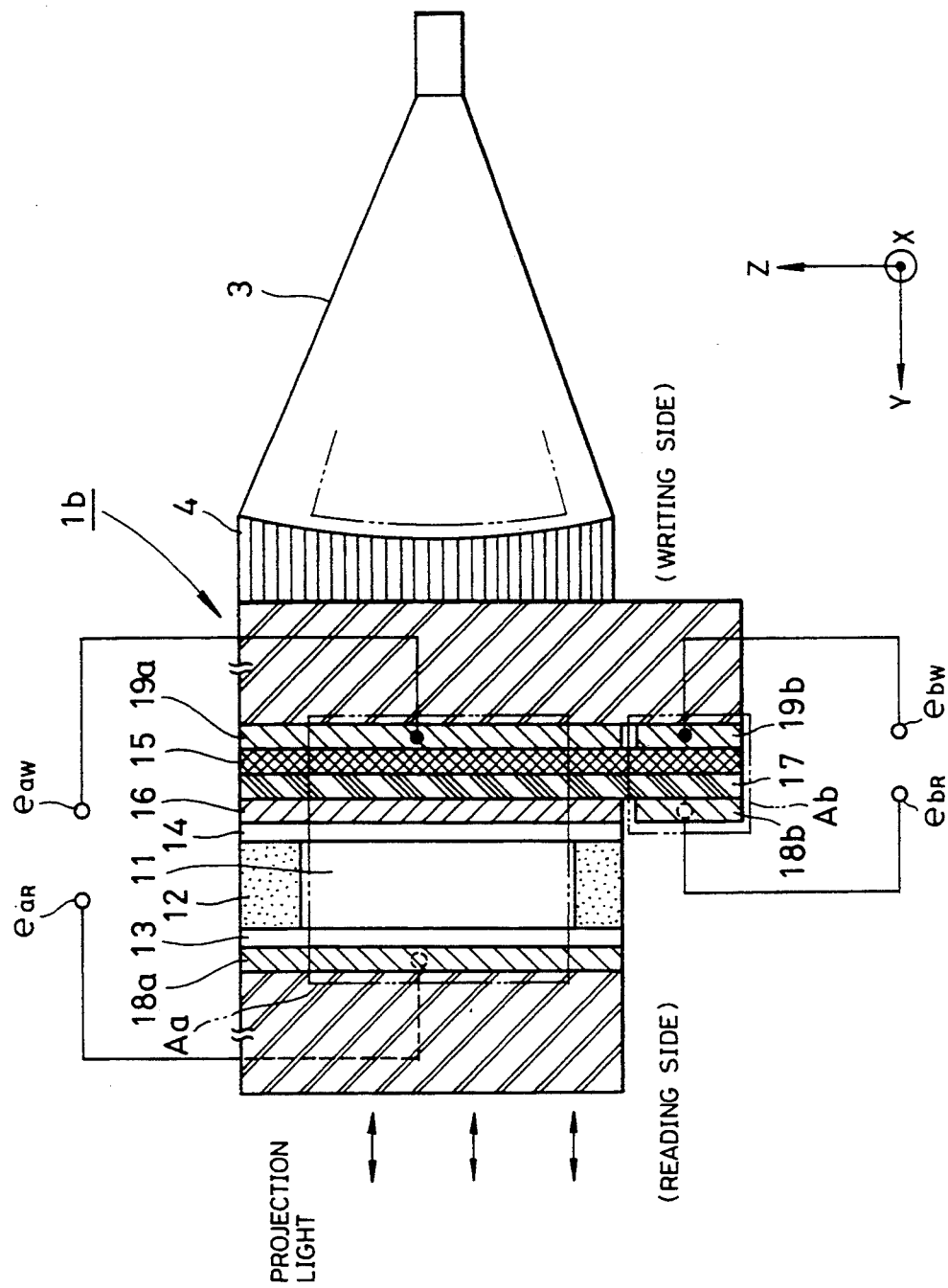
FIG. 14 is a diagram with a part cut away showing a construction in which a CRT is coupled to the photoconductive type liquid crystal light valve of FIG. 13.
Figure 15:
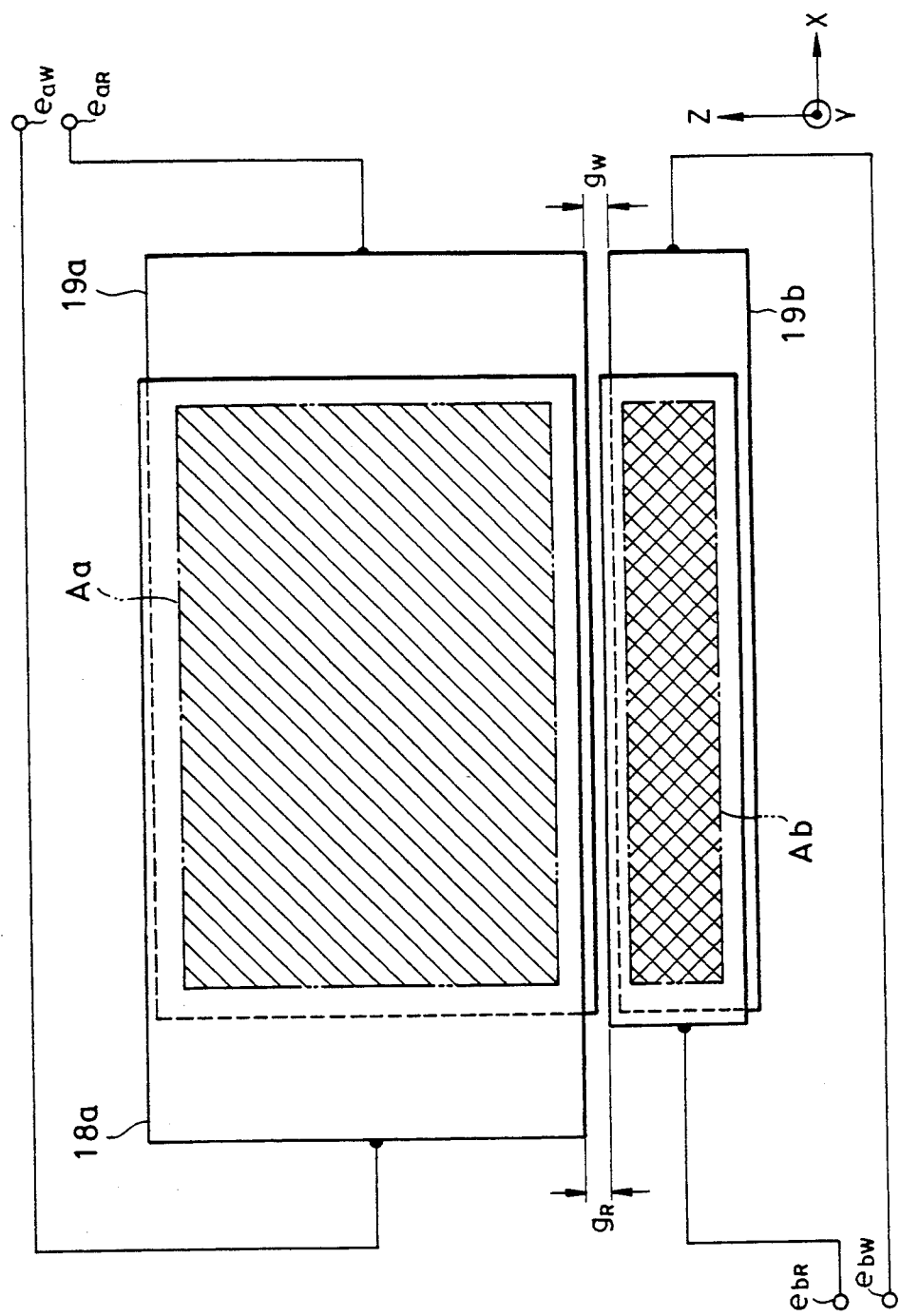
FIG. 15 is a perspective view of an embodiment of the present invention seen through from the reading side while leaving only electrode layers of the photoconductive type liquid crystal light valve of FIG. 13.

FIG. 14 is a diagram with a part cut away showing a construction in which the CRT 3 is coupled to the light valve 1b in FIG. 13 and the portions similar to those shown in FIGS. 1 and 2 are designated by the same reference numerals. FIG. 15 is a perspective view when the light valve 1b is seen through from the upper position in FIG. 13 while leaving only the electrode layer. The electrode portions in FIG. 15 are also illustrated so as to be slightly deviated in the vertical direction in a manner similar to FIG. 6.

In the diagrams, the output image from the CRT 3 enters the light valve 1b through the optical fibers 4. In the light valve 1b, however, the incident image is led into the standard write effective area $A_a$ as an image forming area. The write effective area $A_a$ is sandwiched by the image forming electrodes 18a and 19a on the reading and writing sides and lies within the electrode surfaces. The temperature change detecting area $A_b$ is sandwiched by the temperature change detecting electrodes 18b and 19b on the reading and writing sides and lies within the electrode surfaces. The area $A_b$ is located so as to include the photoconductive film 15 and light shielding film 17 extending below the write effective area $A_a$. It is not essential to have the gap $g_R$ between the image forming electrode 18a and the temperature change detecting electrode 18b on the reading side as shown in FIG. 15 because the layers of those electrodes differ.

Even when the light valve 1b with the construction as shown in FIGS. 13 to 15 is used, the detection of the temperature change and the correction of the driving voltage signal level can be executed in a manner similar to the light valve 1a with the construction as shown in FIGS. 4 to 6. In the light valve 1b, since each temperature change detecting electrode doesn't include the liquid crystal layer 11, the area of the liquid crystal layer 11 is small and it contributes to the improvement of the yield.

Although each of the above embodiments has been described with respect to only one light valve, in case of constructing a color display apparatus, the invention can be also obviously applied to each of the three light valves of R (red), G (green), and B (blue). In this case, since the temperature change detecting means is provided for each light valve, a temperature change according to the location can be corrected in a real-time manner.

Figure 16:
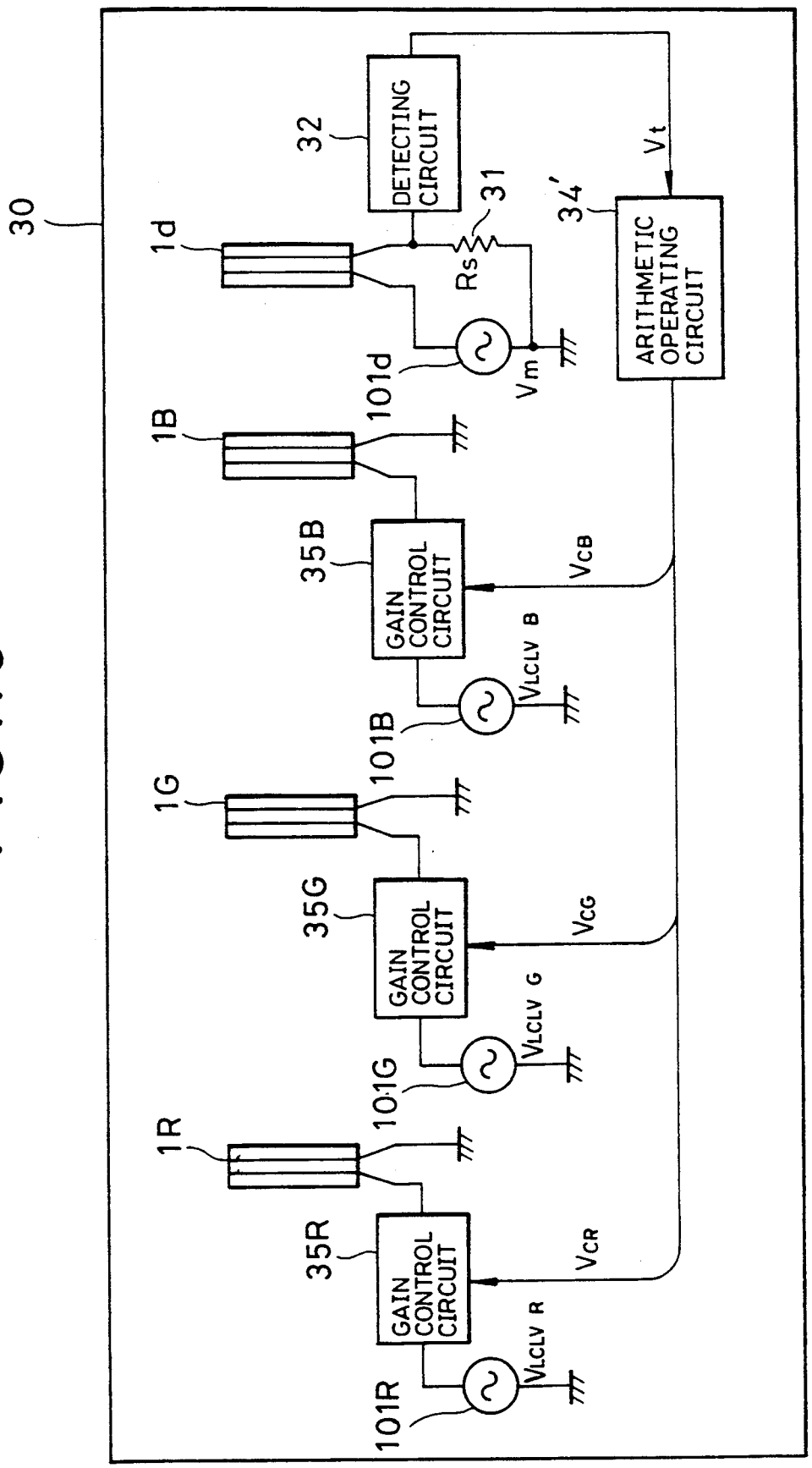
FIG. 16 is a diagram showing a construction of a display apparatus of a photoconductive type liquid crystal light valve according to another embodiment of the invention.

On the other hand, the conventional light valve 1 as shown in FIG. 2 can be also used as it is for detection of a temperature change and the system can be also constructed as shown in FIG. 16. In FIG. 16, description of the construction of the portions other than the portions which are necessary to describe the spirit of the embodiment is omitted here.

In FIG. 16, light valves 1R, 1G, and 1B of R (red), G (green), and B (blue) to form an inherent color image are enclosed in the casing 30. In addition to those light valves, another light valve 1d to detect a temperature change is enclosed in the casing 30. Output driving voltage signals of driving voltage sources 101R, 101G, and 101B corresponding to the light valves to form a color image are supplied to gain control circuits 35R, 35G, and 35B, respectively. Although not shown, the light valve 1d to detect a temperature change is arranged at a position at which the temperature change in each image forming light valve can be most accurately detected, the detection voltage $V_t$ as a temperature change signal is supplied to an arithmetic operating circuit 34' by an output of the detecting circuit 32 with the construction as mentioned above. On the basis of the detection voltage $V_t$, the operating circuit 34' calculates control signals $V_{cR}$, $V_{cG}$, and $V_{cB}$ to be supplied to gain control circuits in order to keep threshold voltages of the image forming light valves constant.

In such a construction, the operations similar to the detection of the temperature change and the correction of the threshold voltages based on the temperature change detection as mentioned above are executed with respect to each light valve, so that the good gradation characteristics and the contrast in the projection image can be maintained. In the embodiment, the layer to detect a temperature change is not provided for the light valve itself by the light valve similar to the image forming light valve is separately prepared to thereby detect a temperature change. There is, consequently, no need to newly design and manufacture the light valve with the electrode structure which enables what is called a temperature change detection to be performed. The apparatus can be constructed by only the general light valve as shown in FIG. 2, so that the invention can contribute to an ease of design and a simplification of the manufacturing steps.

In the photoconductive type liquid crystal light valve according to the present invention as described in detail above, since the voltage signal can be supplied to the light shielding layer which is formed at a location out of the image forming area, a change in impedance of the light shielding layer can be detected and a temperature change of the light valve can be detected. By changing the level of the driving voltage signal which is supplied to the driving electrode on the basis of the detected temperature change, even when a temperature of the light valve fluctuates, the gradation characteristics and contrast of the projection image can be held constant from the time point of the initial setting of the black level.

In the display apparatus of the photoconductive type liquid crystal light valve according to the present invention, a change in impedance between a pair of electrodes of another photoconductive type liquid crystal light valve to detect a temperature change which is arranged in the casing and is different from the photoconductive type liquid crystal light valves to form an image is detected. The temperature change, therefore, of the photoconductive type liquid crystal light valve to form an image can be equivalently detected. By changing the level of the driving voltage signal which is supplied to the driving electrodes of the photoconductive type liquid crystal light valve to form an image on the basis of the detected temperature change, even when the temperature of the image forming light valve fluctuates, the gradation characteristics and contrast in the projection image can be held constant from the time point of the initial setting of the black level. Since the general light valve, further, can be used together with both of the light valves, the invention can contribute to an ease of design and a simplification of the manufacturing steps.

What is claimed is:

1. A photoconductive type liquid crystal light valve, comprising:
   a laminated body, including,
      a liquid crystal layer,
      a photoconductive layer, and
      a light shielding layer;
   a pair of driving electrodes which sandwich said laminated body and forms an image forming area; and
   a pair of temperature change detecting electrodes which are located at positions out of said image forming area and which sandwich at least said light shielding layer for detecting mostly a change in impedance of said light shielding layer associated with a temperature change of said light valve.

2. A photoconductive type liquid crystal light valve according to claim 1, further comprising temperature detecting means connected to said pair of temperature change detecting electrodes, for detecting a change in a temperature of said photoconductive type liquid crystal light valve.

3. A photoconductive type liquid crystal light valve according to claim 2, wherein said temperature detecting means comprises:
   a temperature change detecting resistor connected to at least one of said pair of temperature change detecting electrodes; and
   comparator means for comparing a voltage level across said temperature change detecting resistor to a reference voltage.

4. A photoconductive type liquid crystal light valve according to claim 1, further comprising gain control means for controlling a voltage applied to said pair of driving electrodes in response to a change in a temperature of said photoconductive type liquid crystal light valve.

5. A display apparatus including a photoconductive liquid crystal light valve, comprising:
   a first photoconductive type liquid crystal light valve, including,
      a first liquid crystal layer,
      a first photoconductive layer,
      a first light shielding layer, and
      a pair of driving electrodes which sandwich said first liquid crystal layer, said first photoconductive layer, and said first light shielding layer and form an image forming area; and a second photoconductive type light valve element to detect a temperature change, said second photoconductive type light valve including,
a second liquid crystal layer,
a second photoconductive layer,
a second light shielding layer, and
a pair of temperature change detecting electrodes which sandwich said second liquid crystal layer, said second photoconductive layer, and said second light shielding layer and form a temperature change detecting area;
wherein a temperature change of said display apparatus is detected by detecting mostly a change in an impedance of said second light shielding layer between said temperature change detecting electrodes.

6. A display apparatus including a photoconductive liquid crystal light valve according to claim 5, further comprising temperature detecting means connected to said pair of temperature change detecting electrodes, for detecting said temperature change of said display apparatus.

7. A display apparatus including a photoconductive liquid crystal light valve according to claim 6, wherein said temperature detecting means comprises:
a temperature change detecting resistor connected to at least one of said pair of temperature change detecting electrodes; and
comparator means for comparing a voltage level across said temperature change detecting resistor to a reference voltage.

8. A display apparatus including a photoconductive liquid crystal light valve according to claim 5, further comprising gain control means for controlling a voltage applied to said pair of driving electrodes in response to said temperature change of said display apparatus detected by said change in said impedance between said temperature change detecting electrodes.

9. A color display apparatus having a plurality of photoconductive liquid crystal light valves, comprising:
first, second, third and fourth photoconductive type liquid crystal light valves, each including,
a liquid crystal layer,
a photoconductive layer,
a light shielding layer, and
a pair of driving electrodes which sandwich said liquid crystal layer, said photoconductive layer, and said light shielding layer;
said first, second and third photoconductive type liquid crystal light valves form light valves for primary colors of said color display; and
said fourth photoconductive type liquid crystal light valve forms temperature change measurement means for measuring a temperature change of said color display, said temperature change being detected mostly by a change in an impedance of said light shielding layer between said pair of driving electrodes of said fourth photoconductive type liquid crystal light valve.

10. A color display apparatus according to claim 9, further comprising temperature detecting means connected to said pair of driving electrodes of said fourth photoconductive type liquid crystal light valve, for detecting said temperature change of said color display by measuring said change in said impedance between said pair of driving electrodes of said fourth photoconductive type liquid crystal light valve.

11. A color display apparatus according to claim 10, wherein said temperature detecting means comprises:
a temperature change detecting resistor connected to at least one of said pair of driving electrodes of said fourth photoconductive type liquid crystal light valve; and
comparator means for comparing a voltage level across said temperature change detecting resistor to a reference voltage.

12. A color display apparatus according to claim 9, further comprising gain control means for controlling a voltage applied to said pair of driving electrodes of each of said first, second and third photoconductive type liquid crystal light valves in response to said temperature change of said color display.

* * * * *